United States Patent [19]

Reichert et al.

[11] Patent Number: 5,772,698
[45] Date of Patent: Jun. 30, 1998

[54] REACTIVE DYES FROM THE DIOXAZINE SERIES, THEIR PREPARATION AND USE

[75] Inventors: Hans Reichert, Rheinfelden; Bernhard Müller, Efringen-Kirchen, both of Germany

[73] Assignee: Ciba Specialty Chemicals Corporation, Tarrytown, N.Y.

[21] Appl. No.: 635,812

[22] Filed: Apr. 22, 1996

[30] Foreign Application Priority Data

Apr. 25, 1995 [CH] Switzerland .................. 01175/95

[51] Int. Cl.$^6$ ............... C07D 251/48; C07D 251/50; C07D 498/04; C09B 62/04
[52] U.S. Cl. .................... 8/549; 8/566; 544/75; 544/76; 544/77
[58] Field of Search ............... 544/75, 76, 77; 8/549, 566

[56] References Cited

U.S. PATENT DOCUMENTS

| | | | |
|---|---|---|---|
| 3,996,221 | 12/1976 | Leng et al. | 260/246 R |
| 4,568,742 | 2/1986 | Harms et al. | 544/76 |
| 4,786,721 | 11/1988 | Tzikas et al. | 534/617 |
| 4,876,334 | 10/1989 | Tzikas et al. | 534/632 |
| 4,933,446 | 6/1990 | Sawamoto et al. | 544/76 |
| 5,346,510 | 9/1994 | Krallman et al. | 8/638 |
| 5,356,441 | 10/1994 | Tokieda et al. | 8/543 |
| 5,585,489 | 12/1996 | Russ et al. | 544/76 |

FOREIGN PATENT DOCUMENTS

| | | |
|---|---|---|
| 2083081 | 6/1993 | Canada . |
| 2102553 | 5/1994 | Canada . |
| 0101665 | 2/1984 | European Pat. Off. . |
| 652262 | 5/1995 | European Pat. Off. . |
| 697443 | 2/1996 | European Pat. Off. . |
| 61-40367 | 2/1986 | Japan . |
| 63-210170 | 8/1988 | Japan . |
| 2-55770 | 2/1990 | Japan . |
| 1477071 | 6/1977 | United Kingdom . |

OTHER PUBLICATIONS

Chem. Abstracts, vol. 100:211,658s (1984).
McLelland et al., Chem. Abs. 103:38968, 1985.

*Primary Examiner*—Mukund J. Shah
*Assistant Examiner*—Delpak R. Rao
*Attorney, Agent, or Firm*—David R. Crichton

[57] ABSTRACT

Compounds of the formula

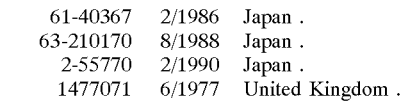

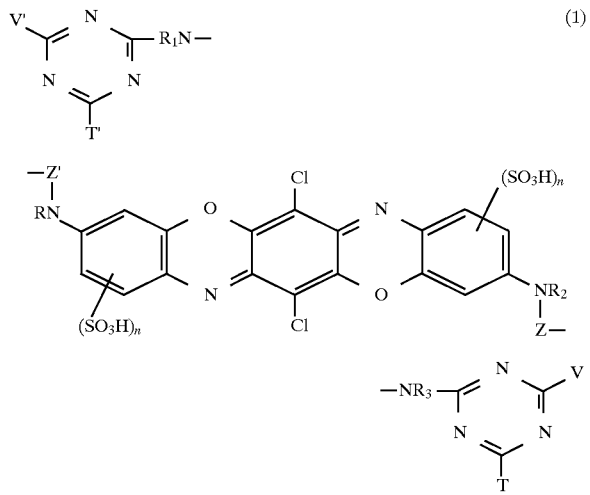

are described in which the variables are as defined in the claims and which are suitable as fiber-reactive dyes for dyeing a wide range of fiber materials.

16 Claims, No Drawings

REACTIVE DYES FROM THE DIOXAZINE SERIES, THEIR PREPARATION AND USE

The present invention relates to novel reactive dyes from the dioxazine series, processes for their preparation and their use.

The practice of dyeing with reactive dyes has more recently led to more stringent demands on the quality of the dyeings and the economy of the dyeing process. As a result, there is still a need for novel reactive dyes having improved properties, in particular with respect to their application.

Nowadays the reactive dyes required for dyeing are those exhibiting sufficient substantivity and, at the same time, good ability of the unfixed portions of dye being washed off. Furthermore, they should have a high colour yield and high reactivity and should produce, in particular, dyeings showing high degrees of fixation. The known dyes do not meet all of these requirements.

Accordingly, the object of the present invention is to find novel improved reactive dyes for dyeing and printing fibre materials which exhibit the qualities pointed out above to a high degree. The novel dyestuffs should be distinguished in particular by high fixation yields and high stabilities of the dye-to-fibre bond and, moreover, it should be easy to wash off the portions which have not been fixed on the fibre. Furthermore, the dyeings should result in good general fastness properties, for example light and water fastness properties.

It has been found that the object stated above can be largely achieved by means of the novel reactive dyes defined below.

The present invention provides compounds of the formula

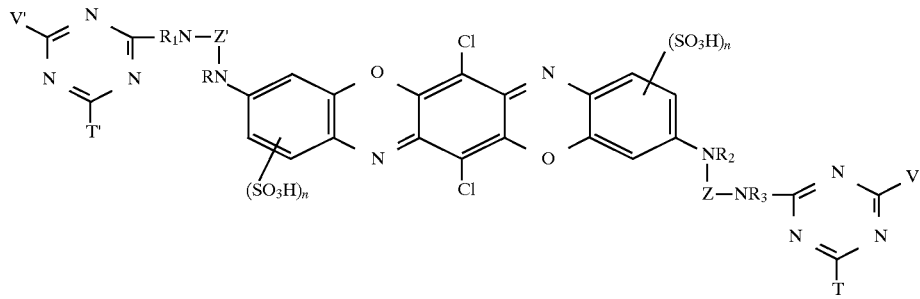

in which
R, $R_1$, $R_2$ and $R_3$ are each, independently of one another, hydrogen or substituted or unsubstituted $C_1$–$C_6$alkyl,
Z and Z' are each, independently of one another, branched $C_2$–$C_{10}$alkylene,
T and T' are each, independently of one another, chlorine, fluorine, bromine, 3-carboxypyridin-1-yl or 3-carbamoylpyridin-1-yl,
V and V' are each, independently of one another, amino, unsubstituted or sulfo-, sulfato-, hydroxyl-, carboxyl- or phenyl-substituted N-$C_1$–$C_4$alkylamino or N,N-di-$C_1$–$C_4$alkylamino, cyclohexylamino, unsubstituted or $C_1$–$C_4$alkyl-, $C_1$–$C_4$alkoxy-, amino-, $C_2$–$C_4$alkanoylamino-, carboxyl-, sulfo- or halogen-substituted phenylamino or naphthylamino, N-$C_1$–$C_4$alkyl-N-phenylamino which is unsubstituted or substituted in the alkyl moiety by sulfo, sulfato, hydroxyl, carboxyl or phenyl and/or in the phenyl moiety by $C_1$–$C_4$alkyl, $C_1$–$C_4$alkoxy, amino, $C_2$–$C_4$alkanoylamino, carboxyl, sulfo or halogen, or are morpholino or a reactive radical of the formula

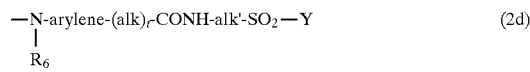

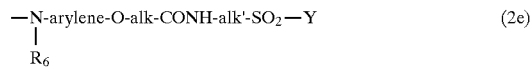

or

$R_4$ is hydrogen, hydroxyl, sulfo, sulfato, carboxyl, cyano, halogen, $C_1$–$C_4$alkoxycarbonyl, carbamoyl or a group —$SO_2$—Y,
$R_5$ is hydrogen, unsubstituted or hydroxyl-, sulfo-, sulfato-, carboxyl- or cyano-substituted $C_1$–$C_4$alkyl or a radical

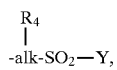

in which $R_4$ is as defined above,
$R_6$ is hydrogen or $C_1$–$C_4$alkyl,
alk and alk' are each, independently of one another, $C_1$–$C_6$alkylene,
arylene is an unsubstituted or sulfo-, carboxyl-, hydroxyl-, $C_1$–$C_4$alkyl-, $C_1$–$C_4$alkoxy- or halogen-substituted phenylene or naphthylene radical,
Y is vinyl or a radical —$CH_2$—$CH_2$—U and U is a leaving group,
$Y_1$ is a group —CHX—$CH_2$X or —CX=$CH_2$,
X is chlorine or bromine,
B is a radical —O— or —$NR_6$— in which $R_6$ is as defined above, and
n and t are each, independently of one another, 0 or 1.

The term sulfo in general includes not only the free acid —SO$_3$H but also any salt form, for example an alkali metal salt, alkaline earth metal salt or ammonium salt or the salt of an organic amine, such as the sodium salt, the potassium salt, the lithium salt or the ammonium salt, the salt of triethanolamine or mixed salts containing two or more different cations of this type, sodium/lithium mixe salts, sodium/ammonium mixed salts or sodium/lithium/ammonium mixed salts. The compounds of the formula (1) contain at least one and preferably at least two sulfo groups.

In general, C$_1$–C$_4$alkyl is methyl, ethyl, n- or isopropyl or n-, iso-, sec- or tert-butyl. In general, C$_1$–C$_4$alkoxy is methoxy, ethoxy, n- or isopropoxy or n-, iso-, sec- or tert-butoxy. Examples of halogen are fluorine, chlorine or bromine. Examples of C$_1$–C$_4$alkoxycarbonyl are methoxycarbonyl and ethoxycarbonyl. Examples of C$_1$–C$_4$alkylthio are methylthio and ethylthio. Examples of C$_2$–C$_4$alkanoylamino are acetylamino and propionylamino.

Examples of R, R$_1$, R$_2$ or R$_3$ as substituted or unsubstituted C$_1$–C$_6$alkyl include unsubstituted or, for example, hydroxyl-, sulfo-, sulfato-, carboxyl-, cyano-, halogen-, C$_1$–C$_4$alkoxycarbonyl- or carbamoyl-substituted methyl, ethyl, n- or isopropyl, n-, sec-, tert- or isobutyl or straight-chain or branched pentyl or hexyl.

R, R$_1$, R$_2$ and R$_3$ are each, independently of one another, preferably hydrogen or C$_1$–C$_4$alkyl, particularly preferably hydrogen, methyl or ethyl, and very particularly preferably they are each hydrogen.

Examples of branched C$_2$—C$_{10}$alkylene radicals Z and Z' are 1,1 -ethylene, 1,2-propylene, 1,1 -dimethyl- 1,2-ethylene, 2-methyl-1,5-pentylene, 1,2-dimethyl- 1,2-ethylene, 2,2-dimethyl- 1,3-propylene, 1-ethyl-1,3-propylene or 2-ethyl-1,6-hexylene. Z and Z' are each, independently of one another, preferably a branched C3–C$_6$alkylene radical and particularly preferably 1,2-propylene or 2,2-dimethyl-1,3-propylene. The radicals Z and Z' can be different or, preferably, identical.

T and T' are each, independently of one another, preferably chlorine or fluorine. The radicals T and T' can be different or, preferably, identical.

Examples of suitable non-reactive radicals V and V' are amino, methylamino, ethylamino, β-hydroxyethylamino, N,N-di-β-hydroxyethylamino, β-sulfoethylamino, cyclohexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2 -naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino or N-β-hydroxyethyl-N-phenylamino.

V and V' as non-reactive radical are each, independently of one another, preferably amino, unsubstituted or hydroxyl-, sulfo- or sulfato-substituted N-mono- or N,N-di-C$_1$–C$_2$alkylamino, cyclohexylamino, unsubstituted or methyl-, methoxy-, carboxyl- or sulfo-substituted phenylamino or naphthylamino, N-C$_1$–C$_2$alkyl-N-phenylamino which is unsubstituted or substituted in the alkyl moiety by hydroxyl, sulfo or sulfato or are morpholino and particularly preferably amino, unsubstituted or sulfo-substituted N-mono- or N,N-di-C$_1$–C$_2$alkylamino, or are phenylamino which is substituted by 1 to 3 identical radicals selected from the group consisting of methyl, methoxy and sulfo or are 1- or 2-naphthylamino which carries 1 to 3 sulfo groups. Particularly preferred meanings of V and V' as non-reactive radicals are, independently of one another, phenylamino which is substituted by 1 to 3 identical or different substituents selected from the group consisting of sulfo, methyl and methoxy, or 2-naphthylamino which is substituted by 1 or 2 sulfo groups and, of these, especially the radicals 2-, 3- or 4-sulfophenylamino, 2,4- or 2,5-disulfophenylamino, 2,5-disulfo-4-methoxyphenylamino, 1-sulfo-2-naphthylamino or 1,5-disulfo-2-naphthylamino.

In V or V' as a reactive radical of the formulae (2a) - (2g), alk and alk' are each, independently of one another, for example, methylene, 1,2-ethylene, 1,3-propylene, 1,4-butylene, 1,5-pentylene, 1,6-hexylene or branched isomers thereof. alk and alk' are each, independently of one another, preferably a C$_1$–C$_4$alkylene radical and particularly preferably an ethylene or propylene radical.

Preferred meanings of arylene are an unsubstituted or sulfo-, methyl-, methoxy- or carboxyl-substituted 1,3- or 1,4-phenylene radical and, in particular, an unsubstituted 1,3- or 1,4-phenylene radical.

In Y as a radical —CH$_2$—CH$_2$—U, the leaving group U can be, for example, —Cl, —Br, —F, —OSO$_3$H, —SSO$_3$H, —OCO—CH$_3$, —OPO$_3$H$_2$, —OCO—C$_6$H$_5$, —OSO$_2$— C$_1$–C$_4$alkyl or —OSO$_2$—N(C$_1$–C$_4$alkyl)$_2$.

Preferably, U is a group of the formula —Cl, —OSO$_3$H, —SSO$_3$H, —OCO—CH$_3$, —OCO—C$_6$H$_5$ or —OPO$_3$H$_2$, in particular —Cl or —OSO$_3$H and, particularly preferably, —OSO$_3$H.

Preferably, Y is vinyl, β-chloroethyl, β-sulfatoethyl, β-thiosulfatoethyl, β-acetoxyethyl, β-phenoxyethyl or β-phosphatoethyl and, particularly preferably, β-sulfatoethyl or vinyl.

Preferably, X is bromine.

R$_4$ is preferably hydrogen.

R$_5$ is preferably hydrogen, C$_1$–C$_4$alkyl or a radical of the formula

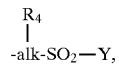

in which R$_4$, Y and alk each have the meanings and preferences given above. Particularly preferably, R$_5$ is hydrogen, methyl or ethyl.

R$_6$ is preferably hydrogen, methyl or ethyl and particularly preferably hydrogen.

The variable B is preferably —NH— or —O— and particularly preferably —O—.

The variable n is preferably 1, and t is preferably 0.

Preferred reactive radicals of the formulae (2a) to (2g) are those in which R$_4$, R$_5$ and R$_6$ are each hydrogen, B is the radical —NH— or —O—, alk and alk' are each, independently of one another, ethylene or propylene, arylene is unsubstituted or methyl-, methoxy-, carboxy- or sulfo-substituted phenylene or unsubstituted or sulfo-substituted naphthylene, Y is vinyl or β-sulfatoethyl, Y$_1$ is —CHBr— CH$_2$Br or —CBr=CH$_2$, and t is 0.

V and V' as reactive radical are each, independently of one another, particularly preferably a group of the formula

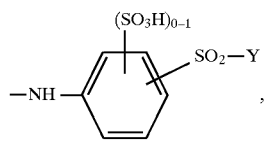  (3a)

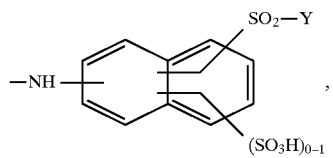  (3b)

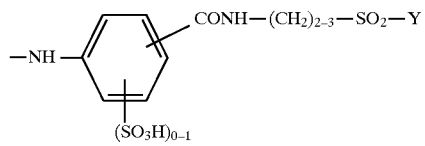  (3c)

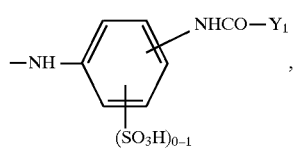  (3d)

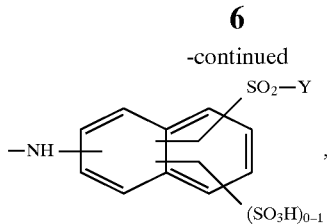  (3b)

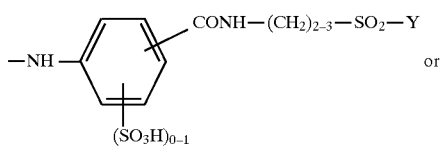  (3c)

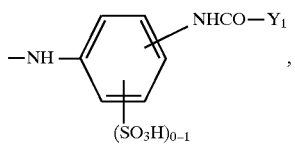  (3d)

in which Y and $Y_1$ each have the meanings and preferences given above.

The radicals V and V' can be different or, preferably, identical.

A preferred embodiment of the present invention relates to compounds of the formula (1) given above in which R, $R_1$, $R_2$ and $R_3$ are each, independently of one another, hydrogen, methyl or ethyl, Z and Z' are each, independently of one another, a branched $C_3$–$C_6$alkylene radical, T and T' in which Y is β-sulfatoethyl or vinyl and $Y_1$ is the group —CHBr—$CH_2$Br or —CBr=$CH_2$, and n is 1.

A particularly preferred embodiment of the present invention relates to compounds of the formula

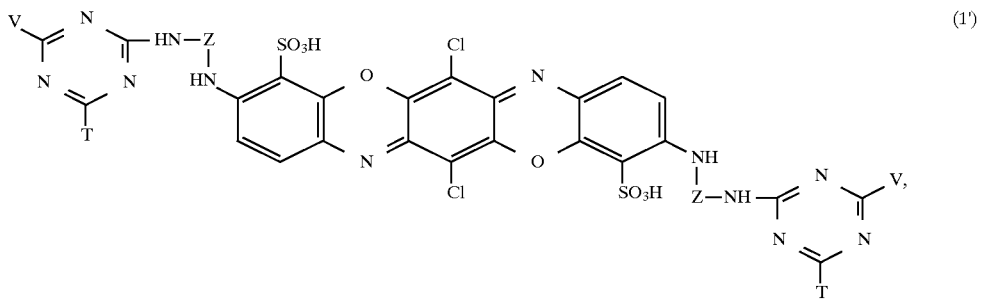  (1')

are each, independently of one another, chlorine or fluorine, V and V' are each, independently of one another, amino, unsubstituted or hydroxyl-, sulfo- or sulfato-substituted N-mono- or N,N-di—$C_1$–$C_2$alkylamino, cyclohexylamino, unsubstituted or methyl-, methoxy-, carbonyl- or sulfo-substituted phenylamino or naphthylamino, N—$C_1$–$C_2$alkyl—N-phenylamino which is unsubstituted or substituted in the alkyl moiety by hydroxyl, sulfo or sulfato, or are morpholine or a reactive radical of the formula

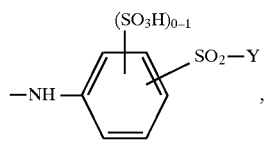  (3a)

in which Z is a branched $C_3$–$C_6$alkylene radical, T is chlorine or fluorine, and V is phenylamino which is substituted by 1 to 3 identical or different substituents selected from the group consisting of sulfo, methyl and methoxy or is 2-naphthylamino which is substituted by 1 or 2 sulfo groups.

The compounds of the formula (1) can be prepared, for example, by condensing a compound of the formula

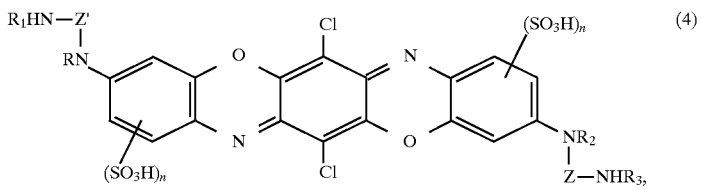 (4)

in which R, $R_1$, $R_2$, $R_3$, Z, Z' and n are each as defined above with about 1 mole equivalent each of a compound of the formula

 (5a)

 (5b)

in which T and T' are each, independently of one another, fluorine, chlorine or bromine and V and V' are each as defined above, in any desired order and, where appropriate, converting one of the two radicals T and T' into another radical T and/or T', respectively, before or after this condensation.

One variant of the process, for example in the case where T is identical to T' and V is identical to V', is to condense the compound of the formula (4) first with about 2 mole equivalents of a compound of the formula

 (5c)

in which T is fluorine, chlorine or bromine, and then with about 2 mole equivalents of a compound of the formula

V—H (6), in which V is as defined above.

Condensation of the compound of the formula (4) with the triazinyl compounds of the formulae (5a), (5b) or (5c) is advantageously carried out in aqueous solution or suspension at low temperatures, for example at 0 to 5° C, and at a weakly acid, neutral or, preferably, weakly alkaline pH, for example at a pH of 7.5 to 10, the hydrogen halide released during condensation being continuously neutralized by addition of, for example, aqueous alkali metal hydroxides, alkali metal carbonates or alkali metal bicarbonates.

The compounds of the formula (4) are novel and are also provided by the invention. They can be obtained in a manner known per se, for example by condensation of 2,3,5,6-tetrachloro-1,4-benzoquinone with the corresponding aromatic amines. The procedure can be, for example, such that about 1 mole equivalent of 2,3,5,6-tetrachloro-1,4-benzoquinone is condensed with about 1 mole equivalent each of the amines of the formula

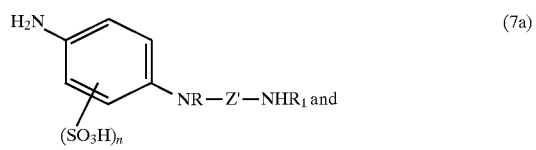 (7a)

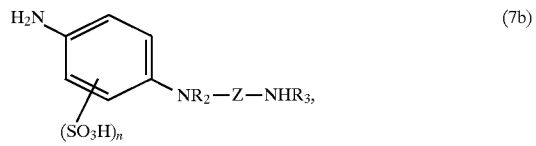 (7b)

in which R, $R_1$, $R_2$, $R_3$, Z, Z' and n are each as defined above, the resulting dianilide is cyclized in the presence of an oxidizing agent, for example oleum, to the dioxazine.

The compounds of the formulae (5a) and (5b) are known or can be obtained in a manner known per se, for example by reacting a trihalo-s-triazine with a compound of the formula (6) as defined above. The compounds of the formulae (5c), (6), (7a) and (7b) are known per se or can be prepared in a manner known per se.

The invention also provides mixtures of different compounds of the formula (1). Of these, preference is given to mixtures comprising one compound each of the formulae

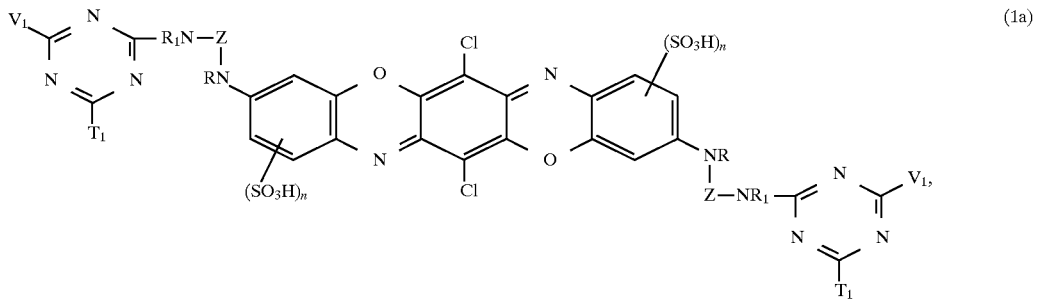 (1a)

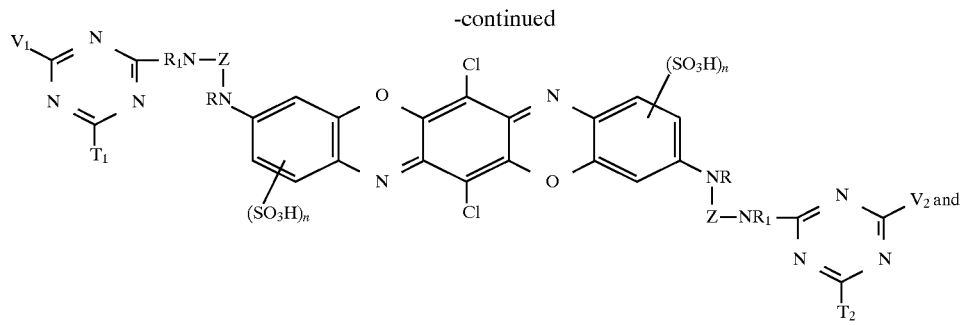

(1b)

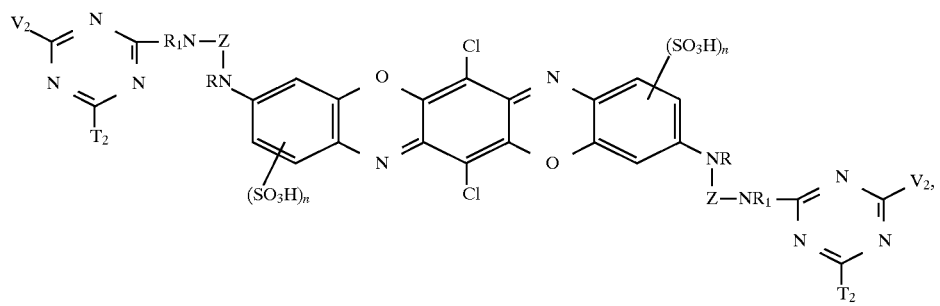

(1c)

in which R, R$_1$, Z and n are each as defined above, V$_1$ and V$_2$ each have, independently of one another, one of the meanings given above for V, and T$_1$ and T$_2$ each have, independently of one another, one of the meanings given above for T, V$_1$ and V$_2$ and/or T$_1$ and T$_2$ being different from one another.

The dye mixtures comprising a plurality of the compounds of the formula (1) can be obtained, for example, by simply mixing the dyes with one another or else, for example in the case of mixtures of one compound each of the formulae (1a), (1b) and (1c), directly during synthesis, for example by reacting a compound of the formula (4) as defined above with a mixture of two different compounds of the formulae (5a) and (5b). Suitable dye mixtures according to the invention comprise, for example, 5 to 60% by weight of the compound of the formula (1a) given above, 20 to 75% by weight of the compound of the formula (1b) given above and 60 to 5% by weight of the compound of the formula (1c) given above, the sum of the three compounds being 100% by weight. Preference is given to dye mixtures comprising one compound each of the formulae (1a), (1b) and (1c) given above, in which Z is branched C3–C$_6$alkylene and n is 1, T$_1$ and T$_2$ are identical and are each fluorine or chlorine, and V$_1$ and V$_2$ are different from one another and are each 2-, 3- or 4-sulfophenylamino, 2,4- or 2,5-disulfophenylamino or a 4-vinylsulfonylphenylamino or 4-β-sulfatoethylsulfonylphenylamino fibre-reactive radical.

The compounds of the formula (1) are suitable as reactive dyes for dyeing or printing a wide range of materials, in particular hydroxyl-containing or nitrogen-containing fibre materials. Examples of nitrogen-containing fibre materials are silk, wool, synthetic polyamide fibre materials, polyurethanes and blend fabrics containing these materials. Examples of hydroxyl-containing fibre materials are natural fibre materials, for example linen, hemp, jute or, in particular, cotton, cellulose, regenerated cellulose and blend fabrics containing these materials. The dyes according to the invention are suitable in particular for dyeing or printing cotton and cotton-containing blend fabrics, for example cotton/polyester or cotton/polyamide blend fabrics.

The compounds of the formula (1) according to the invention are fibre-reactive. Fibre-reactive compounds are understood as meaning those compounds which are capable of reacting with the hydroxyl groups of cellulose, the amino, carboxyl, hydroxyl or mercapto groups of wool and silk or with the amino and, if present, with the carboxyl groups of synthetic polyamides with the formation of covalent chemical bonds.

The dyes according to the invention can be fixed on the fibre in various ways, in particular in the form of aqueous dye solutions or printing pastes. They are suitable not only for dyeing by the exhaust method but also for dyeing by a padding method and they can be used at low dyeing temperatures and require only short steaming times in the pad-steam method. The degrees of fixation are high, and the unfixed portions can be easily washed off, the difference between degree of exhaustion and degree of fixation being remarkably small, i.e. the soaping loss being very small. The reactive dyes of the formula (1) are also suitable for printing, especially on cotton, but likewise also for printing nitrogen-containing fibres, for example wool, silk or blend fabrics containing silk and wool. Liquid formulations of the compounds of the formula (1) and printing pastes containing them are distinguished by a long shelf life.

The dyeings and prints obtained with the compounds of the formula (1) according to the invention on cellulose materials have high colour strength and a high stability of the fibre-to-dye bond, not only in the acid range but also in the alkaline range, and furthermore exhibit good light fastness and excellent wet fastness properties, for example wash, water, seawater, cross-dyeing and perspiration fastness, and also good pleating fastness, hot press fastness, rub fastness and chlorine fastness.

The examples which follow serve to illustrate the invention. Temperatures are given in degrees centigrade, and parts and percentages are by weight, unless stated otherwise. Parts by weight relate to parts by volume as the kilogram relates to the liter.

PREPARATION OF THE COMPOUNDS OF THE FORMULA (4)

Example 1

27 parts of 2-chloro-5-nitrobenzenesulfonic acid are stirred together with 166 parts of 1,2-diaminopropane at room temperature for 8 hours. Excess 1,2-diaminopropane is then distilled off under reduced pressure, and the residue is taken up in water, neutralized with hydrochloric acid, and the solid material is filtered off and dried in vacuo to give 28 parts of N-(2-aminopropyl)-amino-4-nitroaniline-2-sulfonic acid as a yellow powder. This powder is then suspended in 300 parts of water an d reduced at 40 C with hydrogen and 3 parts of 5% Pd/C to give the diamino compound. After clarifying filtration, 12.3 parts of 2,3,5,6-tetrachloro-1,4-benzoquinone are added in portions to the reaction mixture at a temperature of 40 to 60 C, the pH being maintained at a constant value of 6.0 for about 12 hours by adding sodium hydroxide solution. The mixture is then allowed to cool, the resulting dianilide is filtered off, washed with water and dried in vacuo. The finely milled dianilide is introduced in portions into 620 parts of 5% oleum at a temperature of 0 to 5° C., 51 parts of potassium persulfate are added, and the reaction mixture is stirred for about 3 hours. It is then poured onto ice, and the pH is brought to a value of about 3 with sodium hydroxide solution. The blue precipitate is filtered off, washed with warm water and dried in vacuo at elevated temperature to give 49 parts of the compound of the formula

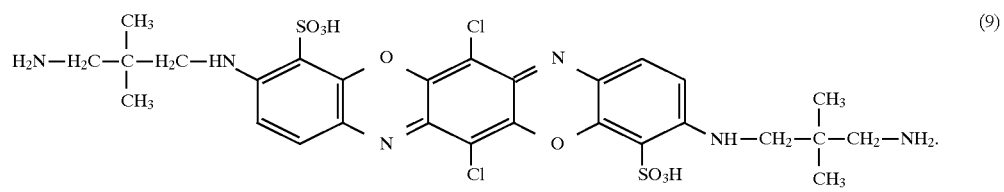

Example 2

26 parts of 2-chloro-5-nitrobenzenesulfonic acid are stirred together with 220 parts of 2,2-dimethyl-1,3-diaminopropane at room temperature for 8 hours. Excess 2,2-dimethyl-1,3-diaminopropane is then distilled off under reduced pressure, and the residue is taken up in water, neutralized with hydrochloric acid, and the solid material is filtered off and dried in vacuo to give 30 parts of N-(3-amino-2,2-dimethylpropyl)-amino-4-nitroaniline-2-sulfonic acid as a yellow powder. This powder is then suspended in 300 parts of water and reduced at 40° C. with hydrogen and 3 parts of 5% Pd/C to give the diamino compound. After clarifying filtration, 12.3 parts of 2,3,5,6-tetrachloro-1,4-benzoquinone are added in portions to the reaction mixture at a temperature of 40 to 60° C., the pH being maintained at a constant value of 6.0 for about 12 hours by adding sodium hydroxide solution. The mixture is then allowed to cool, the resulting dianilide is filtered off, washed with water and dried in vacuo. The finely milled dianilide is introduced in portions into 350 parts of 5% oleum at a temperature of 0 to 5° C., 27 parts of potassium persulfate are added, and the reaction mixture is stirred for about 3 hours. It is then poured onto ice, and the pH is brought to a value of about 3 with sodium hydroxide solution. The blue precipitate is filtered off, washed with warm water and dried in vacuo at elevated temperature to give 27 parts of the compound of the formula

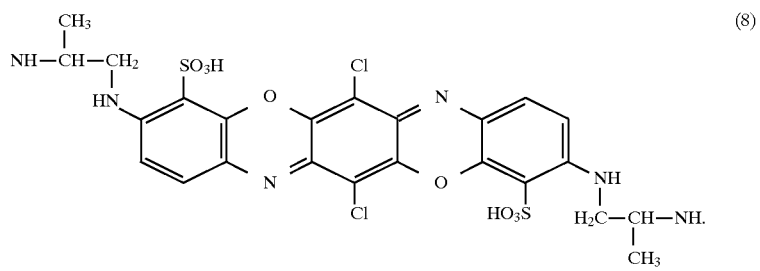

PREPARATION OF THE COMPOUNDS OF THE FORMULA (1)

Example 3

19 parts of cyanuric chloride are stirred thoroughly together with 50 parts of water and the addition of a wetting agent and 5 parts of disodium hydrogen phosphate at a temperature of 0° C. A neutral solution of 17 parts of 2-aminobenzenesulfonic acid in 170 parts of water is added dropwise to the suspension, the pH being maintained during the reaction at a constant value of 5.2 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

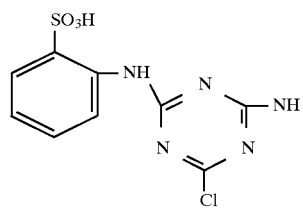
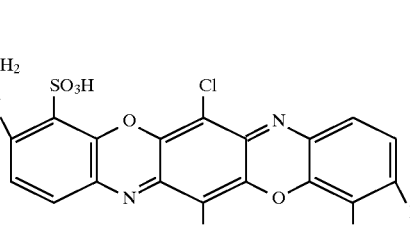

as a violet powder which dyes cellulose in brilliant blue shades.

Example 4

19 parts of cyanuric chloride are stirred thoroughly together with 50 parts of water and the addition of a wetting agent and 5 parts of disodium hydrogen phosphate at a temperature of 0° C. A neutral solution of 28 parts of 2-amino-5-methoxybenzene-1,4-disulfonic acid in 250 parts of water is added dropwise to the suspension, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

Example 5

19 parts of cyanuric chloride are stirred thoroughly together with 50 parts of water and the addition of a wetting agent and 5 parts of disodium hydrogen phosphate at a temperature of 0° C. A neutral solution of 30 parts of 2-aminonaphthalene-1,5-disulfonic acid in 300 parts of water is added dropwise to the suspension, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

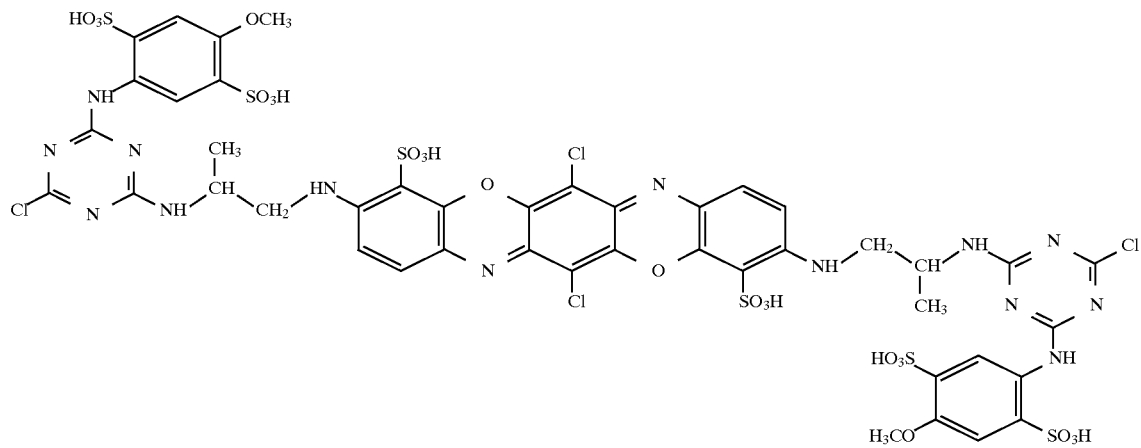

as a violet powder which dyes cellulose in brilliant blue shades.

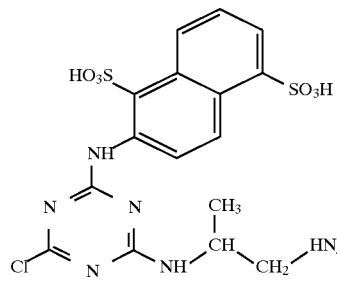

as a violet powder which dyes cellulose in brilliant blue shades.

Example 6

19 parts of cyanuric chloride are stirred thoroughly together with 50 parts of water and the addition of a wetting agent and 5 parts of disodium hydrogen phosphate at a temperature of 0° C. A neutral solution of 25 parts of 2-aminobenzene-1,4-disulfonic acid in 250 parts of water is added dropwise to the suspension, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

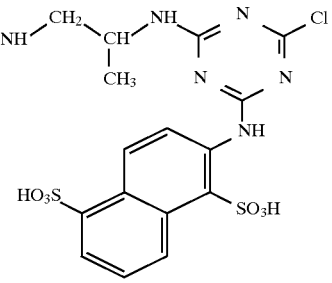

as a violet powder which dyes cellulose in brilliant blue shades.

Example 7

14 parts of cyanuric fluoride are added dropwise at a temperature of 0 to 2° C. to a solution of 17 parts of 2-aminobenzenesulfonic acid and 5 parts of disodium hydrogen phosphate in 170 parts of water, the pH being maintained during the reaction at a constant value of 5.2 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

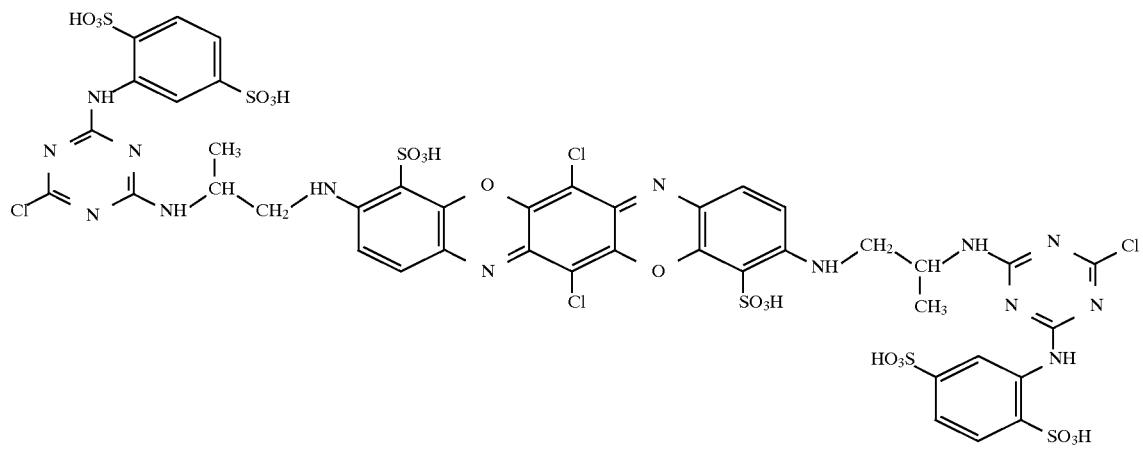

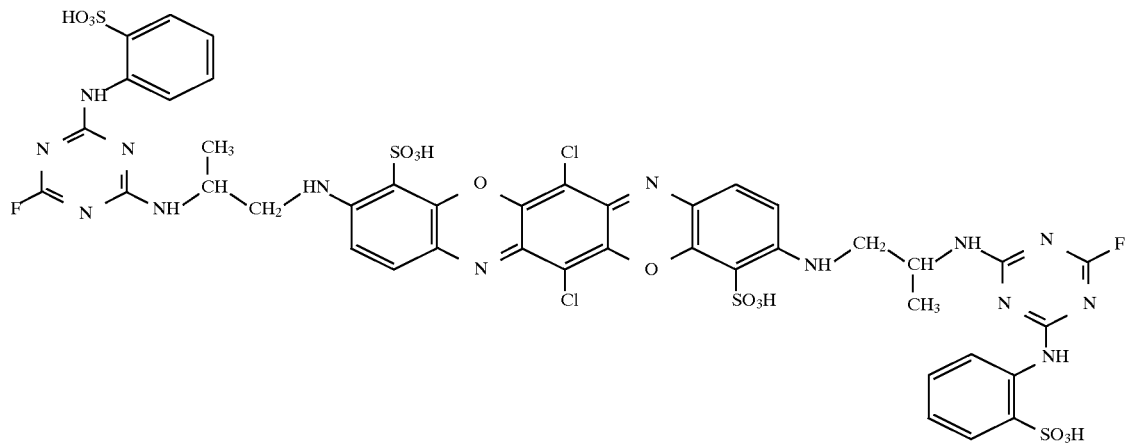

as a violet powder which dyes cellulose in brilliant blue shades.

Example 8

14 parts of cyanuric fluoride are added dropwise at a temperature of 0 to 2° C. to a solution of 25 parts of 2-aminobenzene-1,4-disulfonic acid and 5 parts of disodium hydrogen phosphate in 250 parts of water, the pH being maintained during the reaction at a constant value of 5.2 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

Example 9

14 parts of cyanuric fluoride are added dropwise at a temperature of 0 to 2° C. to a solution of 17 parts of 2-aminobenzenesulfonic acid and 5 parts of disodium hydrogen phosphate in 170 parts of water, the pH being maintained during the reaction at a constant value of 5.2 by adding sodium hydroxide solution. After reaction is complete, a suspension of 36 parts of the compound of the formula (9) according to Example 2 and 3.3 parts of lithium hydroxide monohydrate in 650 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

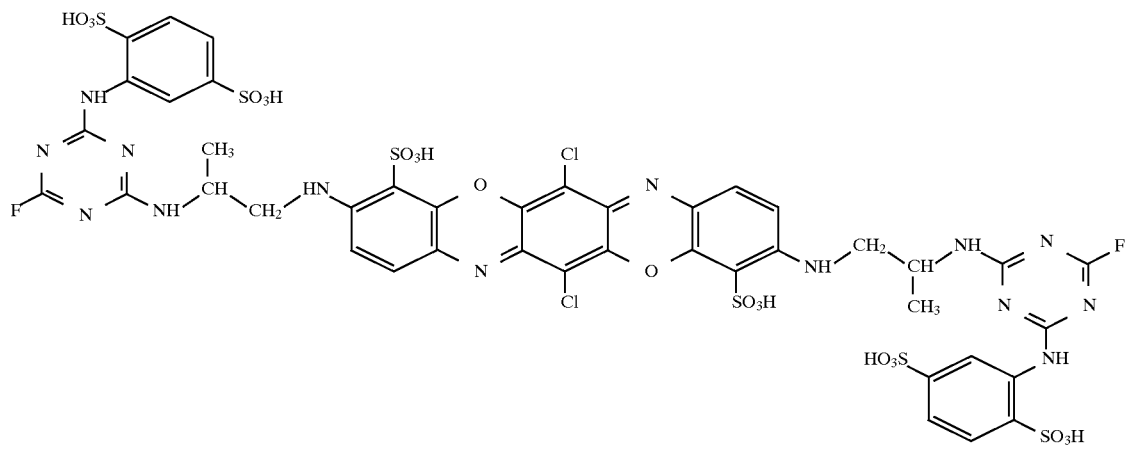

as a violet powder which dyes cellulose in brilliant blue shades.

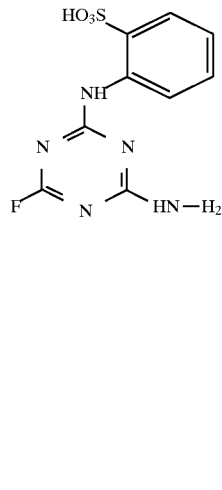

as a violet powder which dyes cellulose in brilliant blue shades.

Example 10

19 parts of cyanuric chloride are stirred thoroughly together with 50 parts of water and the addition of a wetting agent and 5 parts of disodium hydrogen phosphate at a temperature of 0° C. A neutral solution of 28 parts of 2-amino-5-methoxybenzene-1,4-disulfonic acid in 250 parts of water is added dropwise to the suspension, the pH being maintained during the reaction at a constant value of 5.5 by adding sodium hydroxide solution. After reaction is complete, a suspension of 36 parts of the compound of the formula (9) according to Example 2 and 3.3 parts of lithium hydroxide monohydrate in 650 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula as a violet powder which dyes cellulose in brilliant blue shades.

Example 11

14 parts of cyanuric fluoride are added dropwise at a temperature of 0 to 2° C. to a solution of 8.5 parts of 2-aminobenzenesulfonic acid, 12.5 parts of 2-aminobenzene-1,4-disulfonic acid and 5 parts of disodium hydrogen phosphate in 200 parts of water, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 650 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give a mixture of the compounds of the formula

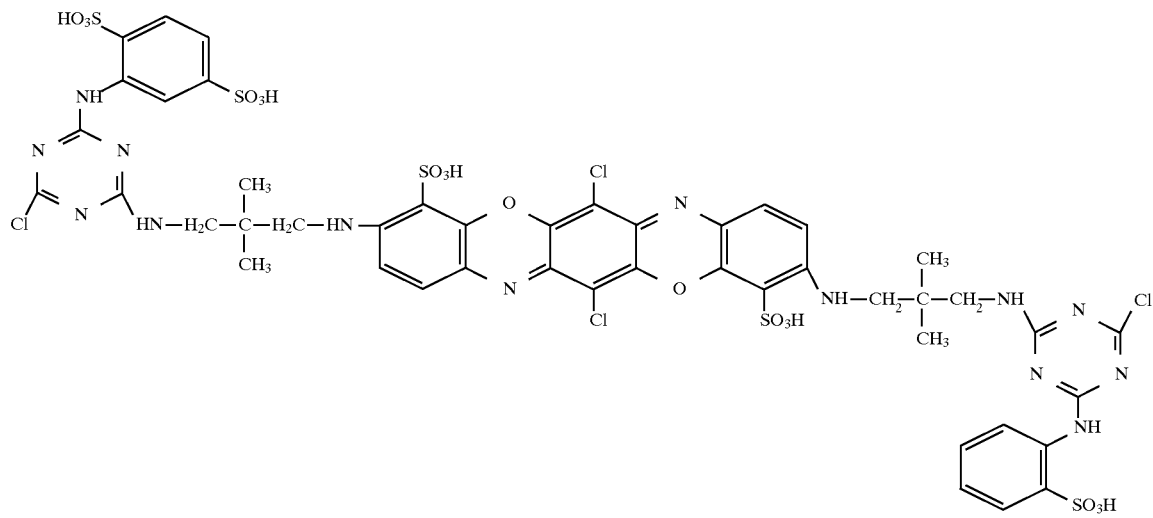

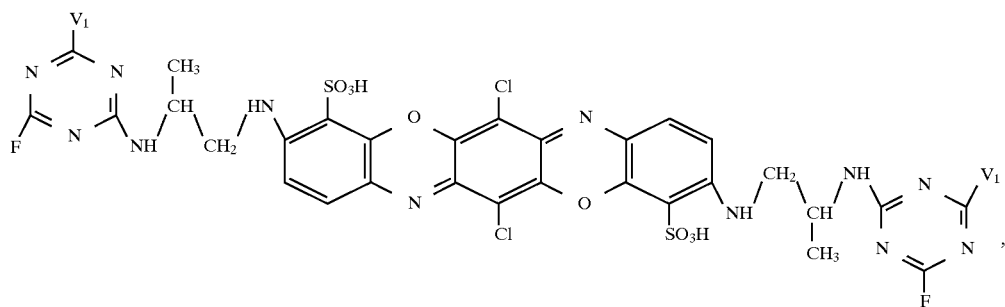
(10a)

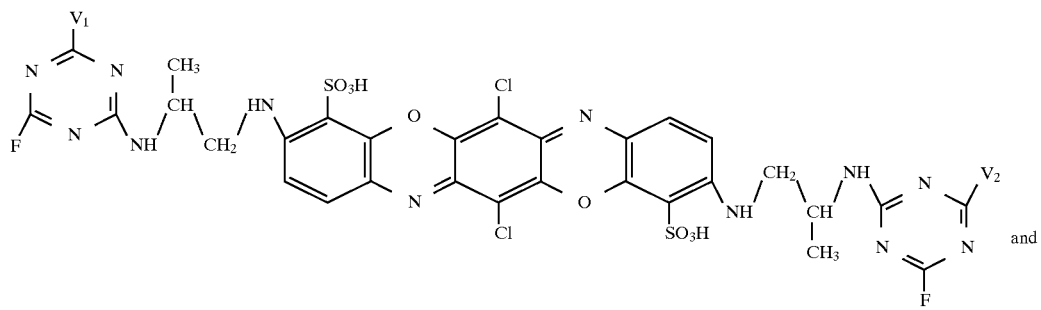
(10b)

and

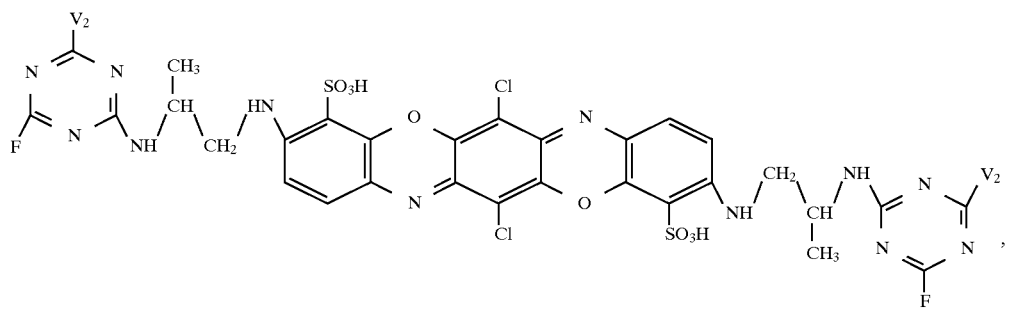
(10c)

in which $V_1$ is 2-sulfophenylamino and $V_2$ is 2,5-disulfophenylamino, and which dyes cellulose in brilliant blue shades.

Example 12

14 parts of cyanuric fluoride are added dropwise at a temperature of 0 to 2° C to a solution of 7.6 parts of 2-aminobenzene-1,4-disulfonic acid, 19.6 parts of 4-β-sulfatoethylsulfonylaniline and 5 parts of disodium hydrogen phosphate in 200 parts of water, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give a dye mixture comprising 49% by weight of the compound of the formula (10 a) given in Example 11, 42% by weight of the compound of the formula (10b) given in Example 11 and 9% by weight of the compound of the formula (10c) given in Example 11, in which $V_1$ is 2,5-disulfophenylamino and $V_2$ is 4-β-sulfatoethylsulfonylphenylamino.

Example 13

Repeating the procedure of Example 12 and replacing the 7.6 parts of 2-aminobenzene-1,4-disulfonic acid and the 19.6 parts of 4-β-sulfatoethylsulfonylaniline by 10.1 parts of 2-aminobenzene-1,4-disulfonic acid and 16.9 parts of 4-β-sulfatoethylsulfonylaniline gives a dye mixture comprising 36% by weight of the compound of the formula (10a) given in Example 11, 48% by weight of the compound of the formula (10b) given in Example 11 and 16% by weight of the compound of the formula (10c) given in Example 11, in which $V_1$ is 2,5-disulfophenylamino and $V_2$ is 4-β-sulfatoethylsulfonylphenylamino.

Example 14

Repeating the procedure of Example 12 and replacing the 7.6 parts of 2-aminobenzene-1,4-disulfonic acid and the 19.6 parts of 4-β-sulfatoethylsulfonylaniline by 12.7 parts of 2-aminobenzene-1,4-disulfonic acid and 14.1 parts of 4-β-sulfatoethylsulfonylaniline gives a dye mixture comprising 25% by weight of the compound of the formula (10a) given in Example 11, 50% by weight of the compound of the formula (10b) given in Example 11 and 25% by weight of the compound of the formula (10c) given in Example 11, in which V, is 2,5-disulfophenylamino and $V_2$ is 4-β-sulfatoethylsulfonylphenylamino.

Example 15

Repeating the procedure of Example 12 and replacing the 7.6 parts of 2-aminobenzene-1,4-disulfonic acid and the 19.6 parts of 4-β-sulfatoethylsulfonylaniline by 15.2 parts of 2-aminobenzene-1,4-disulfonic acid and 11.3 parts of 4-β- sulfatoethylsulfonylaniline gives a dye mixture comprising 16% by weight of the compound of the formula (10a) given in Example 11, 48% by weight of the compound of the formula (10b) given in Example 11 and 36% by weight of the compound of the formula (10c) given in Example 11, in which $V_1$ is 2,5-disulfophenylamino and $V_2$ is 4-β-sulfatoethylsulfonylphenylamino.

Example 16

Repeating the procedure of Example 12 and replacing the 7.6 parts of 2-aminobenzene-1,4-disulfonic acid and the 19.6 parts of 4-b-sulfatoethylsulfonylaniline by 17.7 parts of 2-aminobenzene-1,4-disulfonic acid and 8.4 parts of 4-β-sulfatoethylsulfonylaniline gives a dye mixture comprising 9% by weight of the compound of the formula (10a) given in Example 11, 42% by weight of the compound of the formula (10b) given in Example 11 and 49% by weight of the compound of the formula (10c) given in Example 11, in which VI is 2,5-disulfophenylamino and $V_2$ is 4-β-sulfatoethylsulfonylphenylamino.

Example 17

8.5 parts of 3-aminobenzenesulfonic acid and 8.5 parts of 4-aminobenzenesulfonic acid are dissolved together with 8.4 parts of sodium fluoride in 200 parts of water under neutral conditions. 160 parts of ice and 19 parts of conc. HCl are added to the solution, and 13.5 parts of cyanuric fluoride are rapidly added dropwise at a temperature of 0 to 2° C. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give a dye mixture comprising one compound each of the formulae (10a), (10b) and (10c) given in Example 11, in which $V_1$ is 3-sulfophenylamino and $V_2$ is 4-sulfophenylamino, in a weight ratio of 1:2:1.

Example 18

17 parts of 4-aminobenzenesulfonic acid are dissolved together with 8.4 parts of sodium fluoride in 200 parts of water under neutral conditions. 160 parts of ice and 19 parts of conc. HCl are added to the solution, and 13.5 parts of cyanuric fluoride are rapidly added dropwise at a temperature of 0 to 2° C. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give the compound of the formula

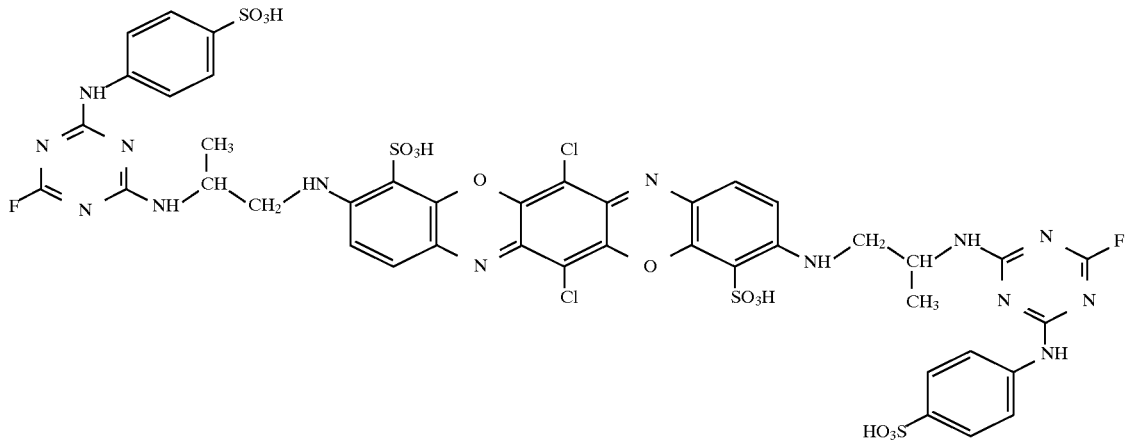

as a powder which dyes cellulose fibres in brilliant blue shades exhibiting good general fastness properties.

Example 19

Repeating the procedure of Example 18 und replacing the 4-aminobenzenesulfonic acid by an equivalent amount of 3-aminobenzenesulfonic acid gives the compound of the formula

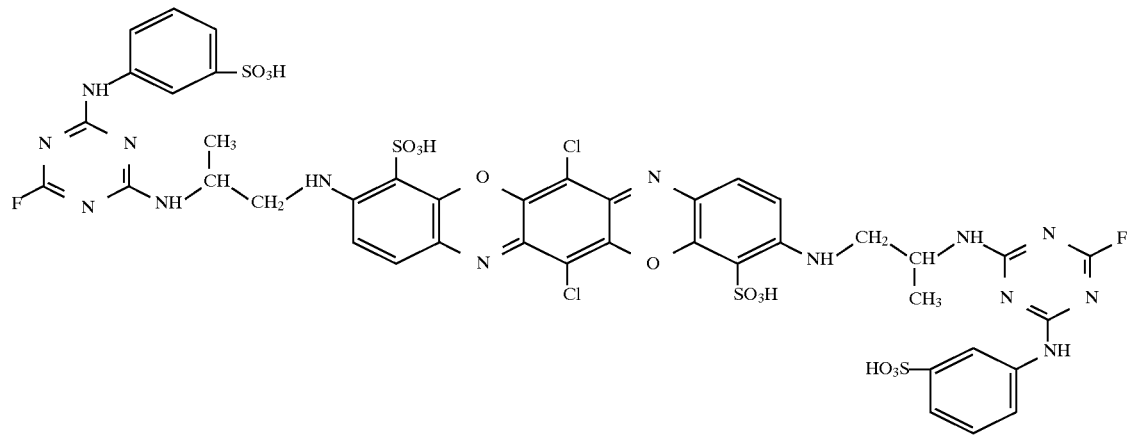

which likewise dyes cellulose fibres in a brilliant blue shade exhibiting good general fastness properties.

Example 20

19 parts of cyanuric chloride and 5 parts of disodium hydrogen phosphate are stirred thoroughly in 50 parts of water at 0° C. A neutral solution of 12.5 parts of 2-aminobenzene-1,4-disulfonic acid and 8.5 parts of 2-aminobenzenesulfonic acid is added dropwise to this suspension, the pH being maintained during the reaction at a constant value of 5.5 by adding sodium hydroxide solution. After reaction is complete, a suspension of 33 parts of the compound of the formula (8) according to Example 1 and 3.3 parts of lithium hydroxide monohydrate in 600 parts of water is added to the reaction mixture, the pH being maintained during the subsequent reaction at a constant value of 9.5 by adding sodium hydroxide solution. After reaction is complete, the reaction mixture is neutralized with hydrochloric acid, substantially desalted by dialysis and evaporated to give a dye mixture comprising the compounds of the formulae

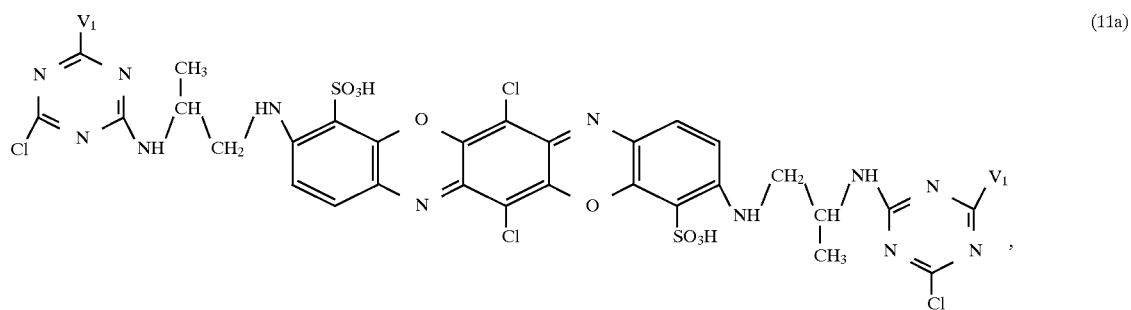

(11a)

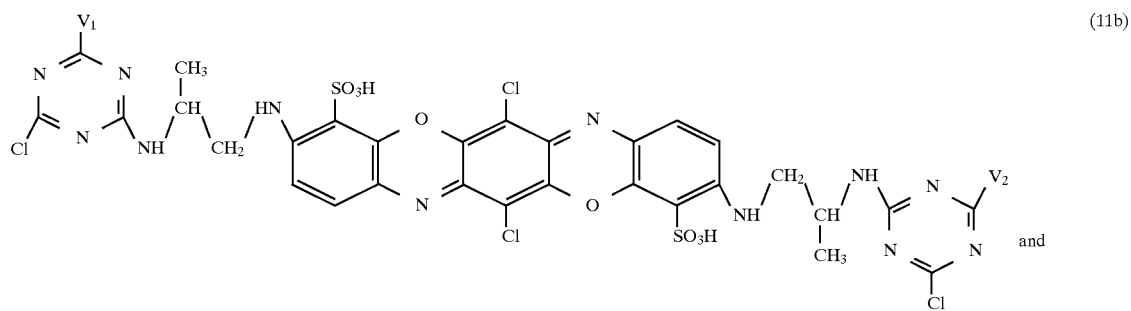

(11b)

and

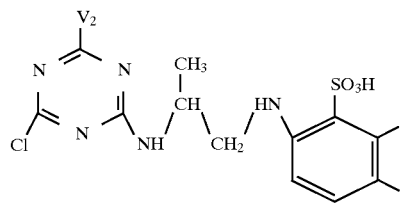 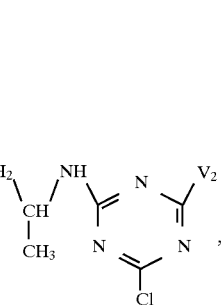

(11c)

in which $V_1$ is 2-sulfophenylamino and $V_2$ is 2,5-disulfophenylamino, and which dyes cellulose fibres in a brilliant blue shade exhibiting good general fastness properties.

Dyeing procedure I:

2 parts of the dye obtained according to Example 3 are dissolved in 400 parts of water, and 1500 parts of a solution containing 53 g of sodium chloride per liter are added. This dyeing bath is entered at 40° C. with 100 parts of a cotton fabric. After 45 minutes, 100 parts of a solution containing 16 g of sodium hydroxide and 20 g of calcined sodium carbonate per liter are added. The temperature of the dyeing bath is maintained at 40° C. for another 45 minutes. The dyed goods are then rinsed, soaped with a nonionic detergent at the boil for a quarter of an hour, rinsed again and dried.

Dyeing procedure II:

2 parts of the reactive dye obtained according to Example 3 are dissolved in 400 parts of water, and 1500 parts of a solution containing 53 g of sodium chloride per liter are added. This dyeing bath is entered at 35 C with 100 parts of a cotton fabric. After 20 minutes, 100 parts of a solution containing 16 g of sodium hydroxide and 20 g of calcined sodium carbonate per liter are added. The temperature of the dyeing bath is maintained at 35° C. for another 15 minutes. The temperature is then raised to 60° C. over a period of 20 minutes. The temperature is maintained at 60° C. for another 35 minutes. The dyed goods are then rinsed, soaped with a nonionic detergent at the boil for a quarter of an hour, rinsed again and dried.

Dyeing procedure III:

8 parts of the reactive dye obtained according to Example 3 are dissolved in 400 parts of water, and 1400 parts of a solution containing 100 g of sodium sulfate per liter are added. This dyeing bath is entered at 25° C. with 100 parts of a cotton fabric. After 10 minutes, 200 parts of a solution containing 150 g of trisodium phosphate per liter are added. The temperature of the dyeing bath is then raised to 60° C. over a period of 10 minutes. The temperature is maintained at 60 C for another 90 minutes. The dyed goods are then rinsed, soaped with a nonionic detergent at the boil for a quarter of an hour, rinsed again and dried.

Dyeing procedure IV:

4 parts of the reactive dye obtained according to Example 3 are dissolved in 50 parts of water. 50 parts of a solution containing 5 g of sodium hydroxide and 20 g of calcined sodium carbonate per liter are added. The resulting solution is used to pad a cotton fabric to a liquor pickup of 70% by weight, and the cotton fabric is then wound onto a batching roller. It is stored in this manner at room temperature for 3 hours. The dyed goods are then rinsed, soaped with a nonionic detergent at the boil for a quarter of an hour, rinsed again and dried.

Dyeing procedure V:

6 parts of the reactive dye obtained according to Example 3 are dissolved in 50 parts of water. 50 parts of a solution containing 16 g of sodium hydroxide and 0.04 liter of water glass (38 Bé) per liter are added. The resulting solution is used to pad a cotton fabric to a liquor pickup of 70% by weight, and the cotton fabric is then wound onto a batching roller. It is stored in this manner at room temperature for 10 hours. The dyed goods are then rinsed, soaped with a nonionic detergent at the boil for a quarter of an hour, rinsed again and dried.

Dyeing procedure VI:

2 parts of the reactive dye obtained according to Example 3 are dissolved in 100 parts of water with the addition of 0.5 part of sodium m-nitrobenzenesulfonate. The resulting solution is used to impregnate a cotton fabric to a liquor pickup of 75% by weight, and the fab ric is then dried. The fabric is then impregnated with a warm solution at 20 C containi ng 4 g of sodium hydroxide and 300 g of sodium chloride per liter, squeezed off to a liquor pickup of 75% by weight, the dyeing is steamed at 100 to 102° C. for 30 seconds, rinsed, soaped in a boiling 0.3% solution of a nonionic detergent for a quarter of an hour, rinsed and dried.

Dyeing procedure VII:

0.1 part of the dye according to Example 3 is dissolved in 200 parts of deionized water, and 0.5 part of Glauber's salt, 0.1 part of a levelling agent and 0.5 part of sodium acetate are added. This dyeing bath is then brought to a pH of 5.5 with 80% acetic acid. It is heated at 50° C. for 10 minutes , and 10 pieces of a woollen fabric are then added. After heating the dyeing bath to 100° C. over a period of about 50 minutes, dyeing is carried out at this temperature for 60 minutes. The dyeing bath is then allowed to cool to 90° C, and the dyed goods are removed. The woollen fabric is rinsed with hot and cold water, spinned and dried to give a brilliant blue dyeing which exhibits excellent light and wet fastness properties.

Printing procedure I:

3 parts of the reactive dye obtained according to Example 3 are sprinkled with rapid stirring into 100 parts of a stock thickener containing 50 parts of a 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, the printed fabric obtained is dried and steamed at 102° C. in saturated steam for 2 minutes. The printed fabric is then rinsed and, if desired, soaped at the boil and rinsed again, and then dried.

Printing procedure II:

5 parts of the reactive dye obtained according to Example 3 are sprinkled with rapid stirring into 100 parts of a stock thickener containing 50 parts of a 5% sodium alginate thickener, 36.5 parts of water, 10 parts of urea, 1 part of sodium m-nitrobenzenesulfonate and 2.5 parts of sodium bicarbonate. The printing paste thus obtained, whose stability meets the industrial requirements, is used to print a cotton fabric, the printed fabric obtained is dried and steamed at 102° C. in saturated steam for 8 minutes. The printed fabric is then rinsed and, if desired, soaped at the boil and rinsed again and then dried.

What is claimed is:

1. A compound of the formula

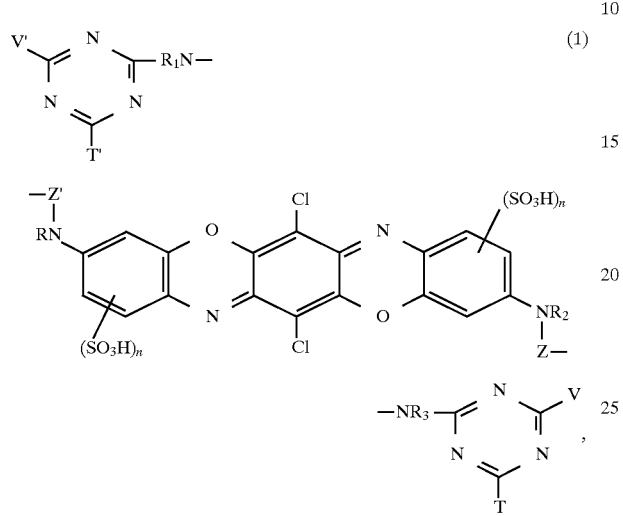

in which

R, $R_1$, $R_2$ and $R_3$ are each, independently of one another, hydrogen or substituted or unsubstituted $C_1$–$C_6$alkyl, Z and Z' are each, independently of one another, branched $C_3$—$C_{10}$alkylene, T and T' are each, independently of one another, chlorine, fluorine, bromine, 3-carboxypyridin-1-yl or 3-carbamoylpyridin-1 -yl, V and V' are each, independently of one another, amino, unsubstituted or sulfo-, sulfato-, hydroxyl-, carboxyl- or phenyl-substituted N—$C_1$–$C_4$alkylamino or N,N-di—$C_1$–$C_4$alkylamino, cyclohexylamino, unsubstituted or $C_1$–$C_4$alkyl-, $C_1$–$C_4$alkoxy-, amino-, $C_2$–$C_4$alkanoylamino-, carboxyl-, sulfo- or halogen-substituted phenylamino or naphthylamino, N—$C_1$–$C_4$alkyl—N-phenylamino which is unsubstituted or substituted in the alkyl moiety by sulfo, sulfato, hydroxyl, carboxyl, or phenyl and/or in the phenyl moiety by $C_1$–$C_4$alkyl, $C_1$–$C_4$alkoxy, amino, $C_2$–$C_4$alkanoylamino, carboxyl, sulfo or halogen, or are morpholino or a reactive radical of the formula

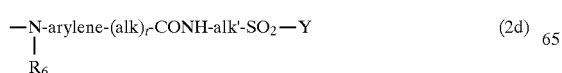

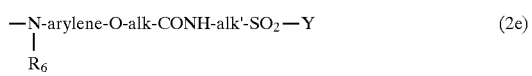

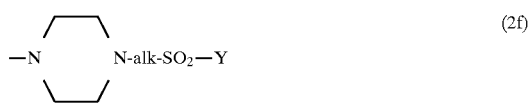

or

$R_4$ is hydrogen, hydroxyl, sulfo, sulfato, carboxyl, cyano, halogen, $C_1$–$C_4$alkoxycarbonyl, carbamoyl or a group —$SO_2$—Y, $R_5$ is hydrogen, unsubstituted or hydroxyl-, sulfo-, sulfato-, carboxyl- or cyano-substituted $C_1$–$C_4$alkyl, $R_6$ is hydrogen or $C_1$–$C_4$alkyl, alk and alk' are each, independently of one another, $C_1$–$C_6$alkylene, arylene is an unsubstituted or sulfo-, carboxyl-, hydroxyl-, $C_1$–$C_4$alkyl-, $C_1$–$C_4$alkoxy- or halogen- substituted phenylene or naphthylene radical, Y is vinyl or a radical —$CH_2$—$CH_2$—U and U is a leaving group, $Y_1$ is a group —CHX—$CH_2$X or —CX=$CH_2$, X is chlorine or bromine, B is a radical —O— or —$NR_6$— in which $R_6$ is as defined above, and n and t are each, independently of one another, 0 or 1.

2. A compound according to claim 1, wherein R and $R_2$ are identical and are each hydrogen or $C_1$–$C_4$alkyl and wherein $R_1$ and $R_3$ are identical and are each, independently of one another, hydrogen or $C_1$–$C_4$alkyl.

3. A compound according to claim 1, wherein Z and Z' are identical and are each a branched $C_3$–$C_6$alkylene radical.

4. A compound according to claim 1, wherein T and T' are identical and are each fluorine or chlorine.

5. A compound according to claim 1, wherein V and V' are each, independently of one another, amino, unsubstituted or hydroxyl-, sulfo- or sulfato-substituted N-mono- or N,N-di-$C_1$–$C_2$alkylamino, cyclohexylamino, unsubstituted or methyl-, methoxy-, carboxyl- or sulfo-substituted phenylamino or naphthylamino, N—$C_1$–$C_2$alkyl—N-phenylaminb which is unsubstituted or substituted in the alkyl moiety by hydroxyl, sulfo or sulfato, or are morpholino.

6. A compound according to claim 1, wherein V and V' are each, independently of one another, amino, unsubstituted or sulfo-substituted N-mono- or N,N-di—$C_1$–$C_2$alkylamino, phenylamino which is substituted by 1 to 3 identical radicals selected from the group consisting of methyl, methoxy and sulfo or are 1- or 2-naphthylamino which carries 1 to 3 sulfo groups.

7. A compound according to claim 1, wherein V and V' are each, independently of one another, a group of the formula

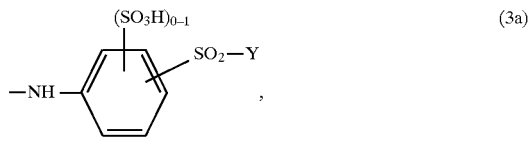

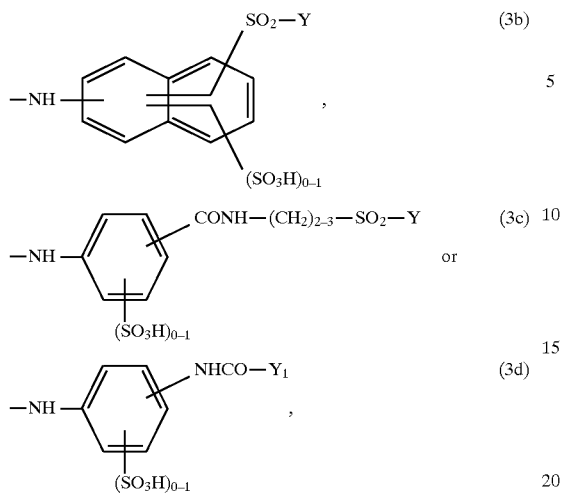

(3b), (3c) or (3d)

in which Y is vinyl or β-sulfatoethyl and $Y_1$ is the group —CHBr—$CH_2$Br or —CBr=$CH_2$.

8. A compound according to claim 1 of the formula (1), in which R, $R_1$, $R_2$ and $R_3$ are each, independently of one another, hydrogen, methyl or ethyl, Z and Z' are each, independently of one another, a branched C3–$C_6$alkylene radical, T and T' are each, independently of one another, chlorine or fluorine, V and V' are each, independently of one another, amino, unsubstituted or hydroxyl-, sulfo- or sulfato-substituted N-mono- or N,N-di—$C_1$–$C_2$alkylamino, cyclohexylamino, unsubstituted or methyl-, methoxy-, carboxyl- oder sulfo-substituted phenylamino or naphthylamino, or are N—$C_1$–$C_2$alkyl—N-phenylamino which is unsubstituted or substituted in the alkyl moiety by hydroxyl, sulfo or sulfato, or are morpholino or a reactive radical of the formula

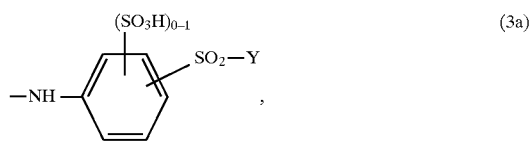

(3a),

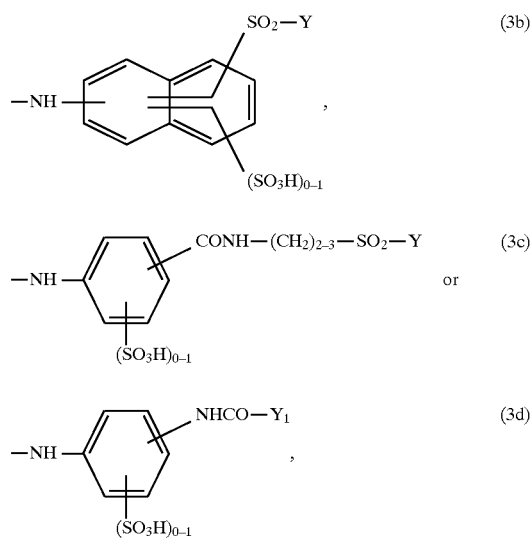

in which Y is β-sulfatoethyl or vinyl and $Y_1$ is the group —CHBr—$CH_2$Br or —CBr=$CH_2$, and n is 1.

9. A compound according to claim 1 of the formula

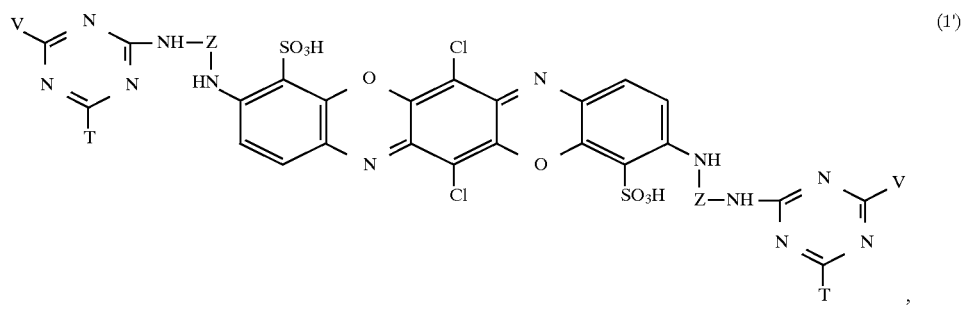

(1')

in which Z is a branched $C_3$–$C_6$alkylene radical, T is chlorine or fluorine, and V is phenylamino which is substituted by 1 to 3 identical or different substituents selected from the group consisting of sulfo, methyl and methoxy or is 2-naphthylamino which is substituted by 1 or 2 sulfo groups.

10. A process for preparing a compound of the formula (1) according to claim 1, which comprises condensing a compound of the formula

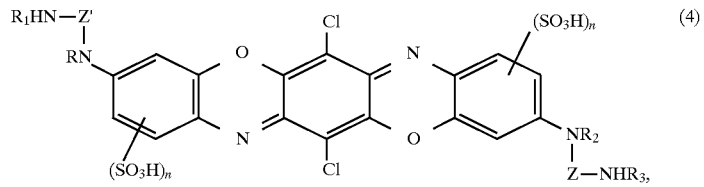

(4)

in which R, $R_1$, $R_2$, $R_3$, Z, Z' and n are each as defined in claim 1, with about 1 mole equivalent each of a compound of the formula

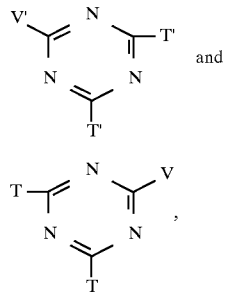

in which T and T' are each, independently of one another, fluorine, chlorine or bromine and V and V' are each as defined in claim 1, in any desired order and, where appropriate, converting one of the two radicals T and T' into another radical T and/or T', respectively, before or after this condensation.

11. A dye mixture, comprising one compound each of the formula

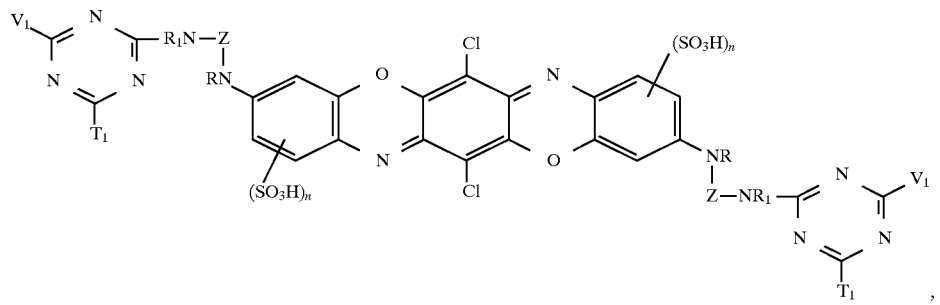

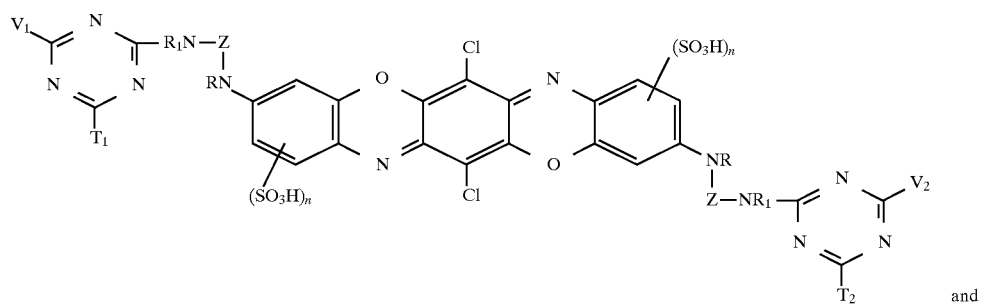

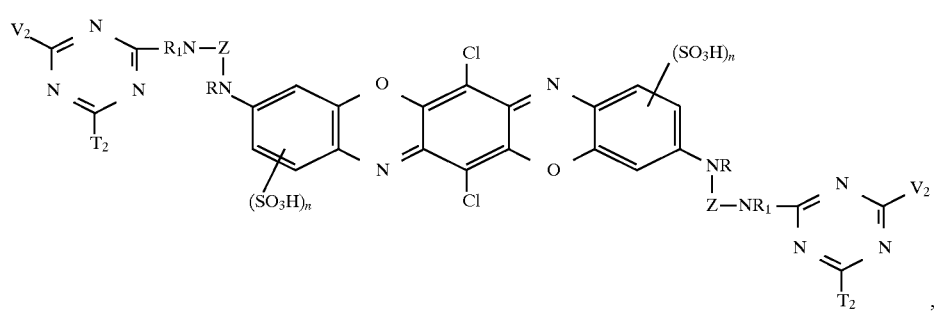

in which R, $R_1$, Z and n are each as defined in claim 1, $V_1$ and $V_2$ each have, independently of one another, one of the meanings given in claim 1 for V, and $T_1$ and $T_2$ each have, independently of one another, one of the meanings given in claim 1 for T, $V_1$ and $V_2$ and/or $T_1$ and $T_2$ being different from one another.

12. A dye mixture according to claim 11, comprising 5 to 60% by weight of a compound of the formula (1a), 20 to 75% by weight of a compound of the formula (1b) and 60 to 5% by weight of a compound of the formula (1c), the sum of the compounds of the formulae (1a), (1b) and (1c) being 100% by weight, in which Z is branched $C_3$–$C_6$alkylene and n is 1, $T_1$ and $T_2$ are identical and are each fluorine or chlorine, and $V_1$ and $V_2$ are different from one another and are each 2-, 3- or 4-sulfophenylamino, 2,4- or 2,5-disulfophenylamino or a 4-vinylsulfonylphenylamino or 4-β-sulfatoethylsu lfonylphenylamino fibre-reactive radical.

13. A process for dyeing or printing a hydroxyl-containing or nitrogen-containing fibre material, which comprises contacting said fibre material in an aqueous dyebath with a compound of the formula (1) according to claim 1.

14. A process according to claim 13 for dyeing or printing a cellulose-containing fibre material.

15. A process for dyeing or printing a hydroxyl-containing or nitrogen-containing fiber material, which comprises contacting said fiber material in an aqueous dyebath with a dye mixture according to claim 11.

16. A process according to claim 15 for dyeing or printing a cellulose-containing fiber material.

* * * * *